Nov. 23, 1965 R. W. WRIGHT 3,219,078
HEAVY DUTY CHUCK
Filed Dec. 3, 1962 6 Sheets-Sheet 2

INVENTOR.
ROBERT WILLIAM WRIGHT
BY
WILSON, LEWIS & McRAE
ATTORNEYS

Nov. 23, 1965 R. W. WRIGHT 3,219,078
HEAVY DUTY CHUCK
Filed Dec. 3, 1962 6 Sheets-Sheet 4

INVENTOR.
ROBERT WILLIAM WRIGHT
BY
WILSON, SETTLE & CRAIG
ATTORNEYS

FIG. 8

3,219,078
HEAVY DUTY CHUCK
Robert William Wright, Detroit, Mich., assignor to Firwood Manufacturing Company, Dearborn, Mich., a corporation of Michigan
Filed Dec. 3, 1962, Ser. No. 241,974
14 Claims. (Cl. 144—288)

This application is continuation-in-part of my earlier-filed application, Serial No. 852,296 filed November 12, 1959.

This invention relates to a heavy service tire holding chuck on which tires can be mounted and inflated for various manufacturing and service operations. More particularly, the invention relates to an improved chuck assembly having a locking mechanism capable of withstanding the high stresses exerted by inflated heavy duty tires.

In my copending application, Serial No. 852,296 filed November 12, 1959 now abandoned, I have disclosed a tire holding chuck which is suitable for average passenger car tires. According to the present invention, I have provided an improvement which includes a heavy service tire holding chuck which is suitable for use with large tires, such as tires for trucks. The difference in the requirements of the two is emphasized by the fact that a truck tire may be required to be inflated during manufacture to approximately 250 lbs. of air pressure whereas a passenger car tire requires only about 18 to 100 lbs.

One of the processes utilized during tire manufacture is post-inflation. Post-inflation is a process in which tires are inflated immediately after curing to maintain the tire cords in a stretched condition while the tire cools. This process minimizes what is called tire growth when the tire is put into use. During normal usage of a tire, the cord forming a portion of the carcass has a tendency to stretch, causing the tire to grow. This is particularly true with respect to nylon cords, and to a somewhat lesser degree with respect to other cord fabrics used in the formation of tire carcasses. Stretching of the fabric during use causes the formation of flat spots on the tire when the weight of the vehicle stands on the tire for an extended period. This situation is particularly aggravated in cold weather when flat spots stay in the tire longer. If a tire is post-inflated, the cords are allowed to stretch before the tire is put into use and the problem of flat spots is minimized.

There are, of course, other instances in which it is desirable to inflate tires. For example, it is desirable to inflate a tire to facilitate sidewall grinding or buffing or to aid in thump testing a tire.

An important object of my invention is, therefore, to provide a chuck mechanism which is suitable for use with heavy duty tires, such as truck tires.

A further object is the provision of a locking mechanism which holds the chuck securely together in tire-clamping position during inflation of a tire.

Another object of the invention is to provide a fluid pressure actuated piston operable to shift locking dogs carried by one chuck member to a position where they will engage clamping surfaces formed on the opposite chuck member to prevent separation of the chuck members while a tire clamped therebetween is inflated.

An additional object of my invention is the provision of locking dog engaging surfaces which cooperate to cam the locking dogs to a locking position whereby, if the locking dogs are inadvertently in partially engaged position before tire inflation, they will move to full engagement upon tire inflation.

Another object is to provide a locking arrangement for the chucks in which locking elements or dogs are placed between abutments on the two tire chuck halves, so that the separating force on the chuck halves causes the abutments to exert forces toward each other, which latter forces are resisted by compression forces set up in the locking elements.

Another object is to provide a chuck and locking arrangements therefor in which a center post on one chuck half passes through the other chuck half when the chuck halves are brought into position to hold a tire under pressure between them, and in which a series of locks on the other chuck half surrounds the post and prevents withdrawal of the post by compressive forces in the locks. More specifically it is an object to operate the locks by separate fluid pressure motors and gear the locks together to insure synchronous operation including precision positioning of all the locks alike.

Another object of my invention is to provide an improved chuck which may be rotated with an inflated tire in position thereon.

Other objects of this invention will appear in the following description and appended claims, reference being had to the accompanying drawings forming a part of this specification wherein like reference characters designate corresponding parts in the several views.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

The improved heavy service tire inflating and holding device 10 comprises first and second axially aligned chuck members 12, 14 (FIG. 1) which are movable relative to each other to hold a tire therebetween. Both chuck members are circular to fit a tire. The first chuck member 12 is hollow like a bowl, having a central opening 13 to receive a heavy cylindrical boss 36 forming part of the second chuck member 14. A plurality of locking dogs 32 are pivotally mounted on the boss 36 to engage an annular locking surface 44 formed within the chuck member 12 adjacent the opening 13. Means are provided to pivot the locking dogs 32 whereby after the boss 36 is inserted into the chuck member 12, the locking dogs are positioned in the path of the surface 44 to prevent separation of the chuck members. Means are also provided to inflate a tire held between the locked chuck members.

Figures 1, 1A:
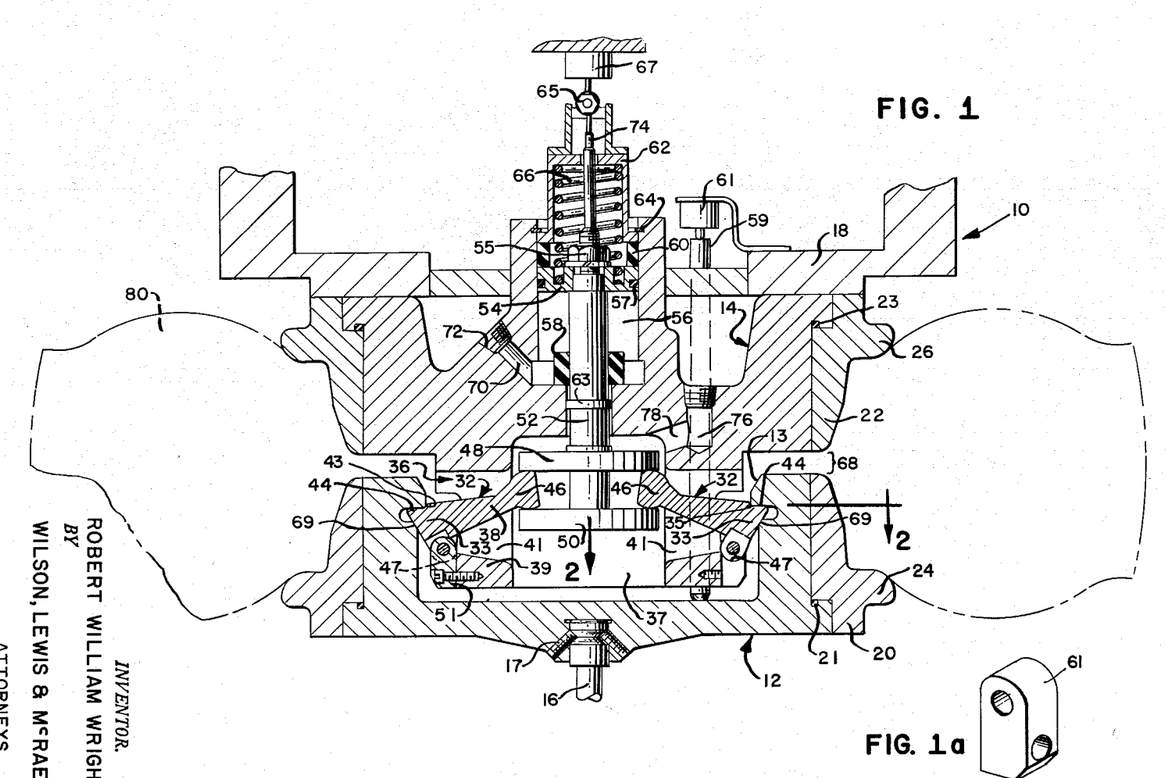
FIGURE 1 is a vertical axial section of a chuck mechanism embodying one form of my invention, a part being removed.
FIGURE 1a is a perspective view of a part removed from FIGURE 1.

The lower chuck member 12 is supported and moved by axially shiftable rod 16, detachably secured thereto by means of set screws 17. The rod 16 is secured at its lower end to suitable power means (not shown), such as an hydraulic cylinder, to provide the required axial movement thereof. The upper chuck member 14 is secured to supporting structure 18.

Each chuck member 12, 14 is provided with a detachable bead supporting ring 20, 22 having radial flanges 24, 26 which form shelves to engage and support the bead of the tire. O-rings 21, 23 provide a fluid-tight seal between the bead rings and chuck members. The rings 20, 22 may be provided in a variety of sizes to accommodate different tire diameters.

The boss 36 is formed with an axial bore 37 which defines a cylindrical wall 39. Circumferentially spaced apertures 41 are formed in the wall 39 through which pass the arms 38 of a plurality of circumferentially spaced locking dogs 32 provided with bearing surfaces 45 which are pivotally mounted on the cylindrical grooves 47 of the portion 36.

Figures 2, 3:
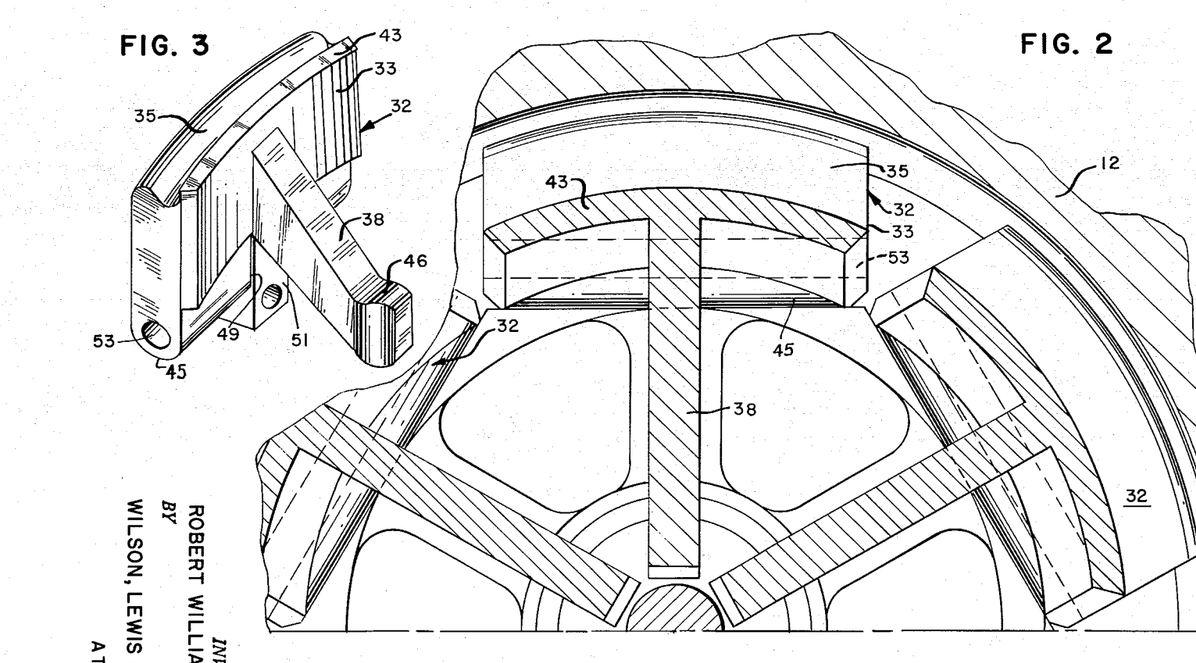
FIGURE 2 is a sectional view taken substantially along the line 2—2 of FIGURE 1 looking in the direction of the arrows.
FIGURE 3 is a perspective view of a locking dog and its retaining bracket of the chuck mechanism of FIGURE 1.

The locking dogs 32 are designed to take the entire force exerted by the chuck members 12, 14 almost entirely in compression rather than in shear. This is advantageous because shear strength is only about three-quarters of the compressive strength of a metal. The dogs 32 are also provided with large upper load bearing surfaces 35 which are positioned closely together, as may be noted in FIG. 2, whereby the load is distributed over a large area. In theory, the load bearing sections 33 of the dogs 32 are intended to form a conical ring which is interposed between chuck member 12 and boss 36 to act as a strut to prevent separation of the chuck members while a tire is being inflated. Since it is impossible to provide a removable annular strut, a conical ring has been segmented and each segment pivotally mounted on one dog to permit locking and unlocking of the chuck members.

The locking dogs 32 have a general T-shape plan comprising a load bearing element 33 terminating in a flat, circular locking surface 35 and having an inwardly extending arm 38. The lower surface of each load bearing element 33 is cylindrical. It rests on a mating cylindrical bearing groove 47 formed on the boss 36, there being as many grooves 47 as there are locking dogs 32. The grooves and the rounded lower ends are formed as straight cylindrical surfaces; they do not follow the curvature of the portion 36 or elements 33. This straight configuration permits pivoting of the dogs in the grooves and also complete engagement of the grooves and rounded ends when the chuck members are locked together. Midway between the ends of each bearing surface 45 a slot 49 is provided to receive a keeper or mounting bracket 51 secured to the boss 36 by any suitable fastening such as a screw. A pin 53 extends loosely through holes provided in the element 33 and bracket 51 to prevent the dogs 32 and the cylindrical portion 36 from being separated.

The upper surfaces of the elements 33 have flat portions 35 to engage the flat annular locking surface 44. The surface 44 does not exert the entire force along the axis of the load bearing elements 33 since, as may be seen in FIG. 1, the load bearing elements extend angularly between the grooves 47 and surface 44. It is therefore preferred to provide a stop for the elements 33. In the embodiment shown, a conical surface 69 has been provided adjacent the surface 44 to act as this stop. The same result is also achieved by providing a shoulder 43 (FIG. 3) on the element 33 to abut against the inner wall of the chuck member 12. While both the stop surface 69 and shoulder 43 have been provided for illustration, it is readily apparent that either would suffice.

The dog operating arms 38 extend through the apertures 41 and into the recess 37 of the boss 36. The inner ends of the arms 38 are provided with knobs 46 which are positioned between spaced plates 48, 50 carried by a piston rod 52. The rod 52, which is slidably mounted in the upper chuck member 14, has a piston 54 secured on the upper end by means of a nut 55. The piston 54 is slidably mounted in a cylinder 56 which is formed in the upper end of the chuck member 14. Packing 57 provides a fluid-tight seal between the piston and cylinder walls, while O-ring 63 seals the rod 52 and chuck member 14.

In operation, upward or outward movement of the piston 54 pivots the dogs 32 into the locking position illustrated in FIG. 1, while downward or inward movement of the piston 54 carries the dogs 32 out of the path of the inner surface of the lower chuck member 12 so that the lower chuck can be removed from the upper.

Resilient bumpers 58, 60 are provided at the outer and inner ends of cyilnder 56 to act as shock absorbers for the piston 54. The outer end of the cylinder 56 is covered by means of a cap 62 secured by snap ring 64. A spring 66 is provided withinthe cap 62 to engage the piston 54 and constantly urge it inwardly toward unlocked position.

Fluid, such as air pressure, is supplied to the piston cylinder 56 through the passageway 70 to actuate the piston outwardly. The passageway 70 is threaded at 72 for connection to a source of fluid pressure. When fluid pressure is applied to force the piston 54 up, the plates 48, 50 lift the knobs 46 to pivot the locking dogs 32 into locking position in the path of the locking surface 44 of the lower chuck member 12.

A spring loaded plunger 59 is provided in the upper chuck member 14 to actuate the operator 59 of a switch 61. The switch 61 controls the operation of a valve which admits fluid under pressure to the locking cylinder 56. The lower end of the plunger 59 extends downwardly from the upper chuck member 14 to engage the lower chuck member 12 before the chuck members 12, 14 are in position to be locked. In operation, when the chuck members are in proper position the lower chuck member 12 drives the plunger 59 upwardly to contact the switch and thus actuate the piston 54 to pivot the dogs 32 to their locked position.

The upper end of the piston rod 52 is provided with an indicating rod 74 which extends through an opening in the cap 62. The rod 74 provides visual indication that the locking mechanism has been actuated and indicates that it is safe to introduce air to inflate the tire 80 carried by the chuck members 12, 14. The member 65 on the upper end of the rod 74 may be utilized, if desired, to actuate a valve control 67 which is operable to effectuate the admission of air under pressure through the passageways 76, 78 to inflate the tire 80. Such an arrangement permits the tire to be automatically inflated as soon as the locking mechanism has been actuated and prevents admission of air until the locks are in place.

It is necessary to provide clearance 68 to permit pivoting dogs 32 to clear the clamping surface 44. Consequently, the dogs and the engaging surfaces may be separated a small distance after pivoting of the dogs into locked position. This clearance is taken up by outward movement of the chuck members 12, 14 when the tire is inflated. As the chuck members are shifted away from each other by the tire walls, a force is exerted on the dogs 32 by the locking surface 44 tending to rotate the portions 33 of the dogs outward. It will be appreciated that as a result of this pivoting of the dogs 32, it is only necessary that a portion of the dog surface 35 be in abutment with the engaging surface 44 when a tire is inflated. The dogs 32 will always be pivoted in the direction of secure engagement after inflation of the tire.

In operation of the chuck mechanism, a tire 80 is positioned over the lower bead supporting ring 20. The lower chuck member 12 is then elevated towards the upper chuck member 14 until the upper bead of the tire moves into engagement with the flange 26. Fluid pressure is then applied to the piston 54 to pivot the locking dogs 32 to their locking position.

The tire 80 is retained in the inflated condition for the desired length of time. At the end of this period, the tire is deflated, the cylinder 56 is vented, and the spring 66 forces the piston rod 52 downwardly to pivot the dogs 32 to unlocked position, and the lower chuck member 12 is lowered to a point where the tire 80 may be removed and a new tire mounted for inflation.

It will be noted that in order for the clamping surface 35 of the dogs 32 to move out of the obstructing position relative to the locking surface 44, it is first necessary that the lower and upper chuck members 12, 14 move towards each other a short distance to provide the clearance which permits the dogs 32 to pivot upwardly and clear the inner edge of the surface 44. As a consequence of this required motion, after a tire has been positioned on the rings 20, 22 and the dogs have been moved to locking position, it is impossible for the chuck members to separate until they have first moved toward each other. This is a safety feature since it is impossible to unlock the device with an inflated tire positioned thereon because the separating force exerted by the tire walls will prevent the chuck members 12, 14 moving towards each other to permit pivoting of the locking dogs 32.

Figure 4:
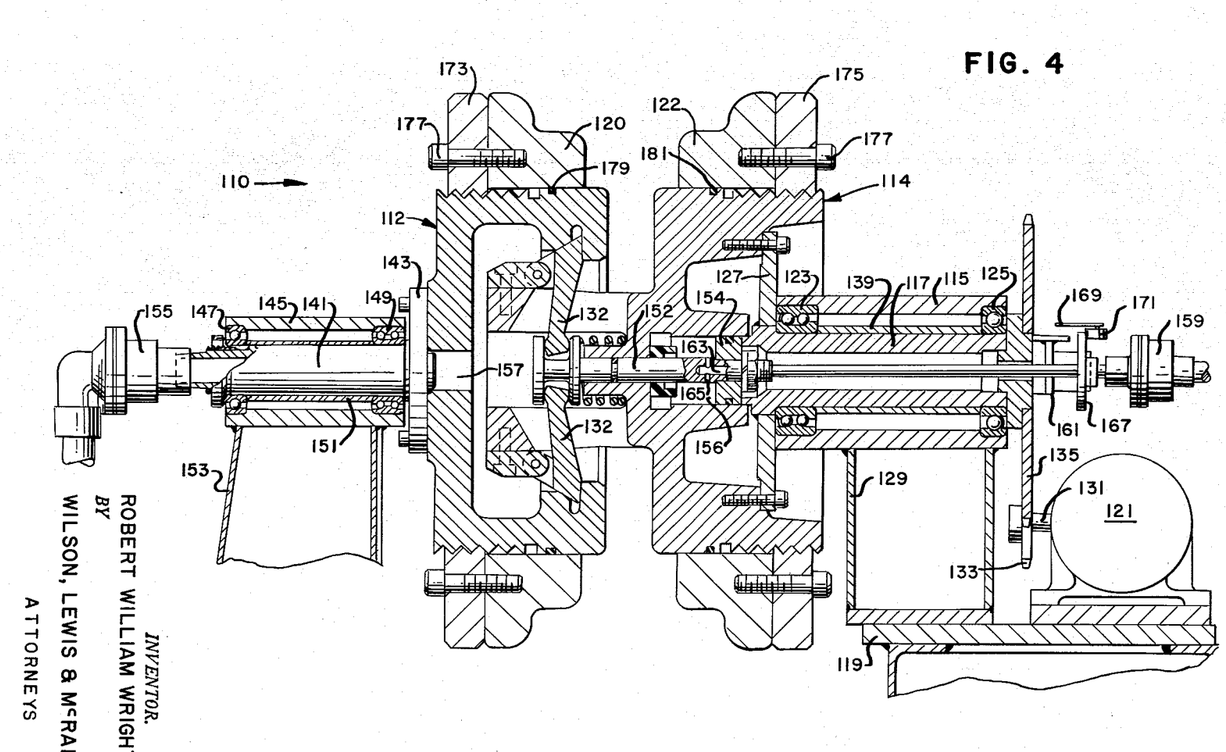
FIGURE 4 is an axial section of a modified chuck mechanism similar to the FIGURE 1 embodiment but in which the chuck is rotable.

The embodiment of the invention illustrated in FIG. 4 is similar in many respects to that illustrated in FIG. 1. The FIG. 4 embodiment differs from the FIG. 1 embodiment principally in that means are provided to permit rotation of the chuck 110. Chuck rotation is useful when it is desired to perform an operation on a tire other than post-inflation. For example, it may be desired to quickly and uniformly cool the tire by means of a coolant spray directed onto the tire as it revolves. In other instances, it may be desirable to buff, grind or brush the sidewalls of a tire or to thump test the tire.

In the FIG. 4 embodiment, the chuck members 112, 114 are positioned along a horizontal axis. Each chuck member is rotatably mounted whereby the entire chuck mechanism may be driven as a unit when a tire is mounted thereon. Suitable rotatable fluid-tight connections are provided to supply the necessary fluid pressure to reciprocate the piston 154 and to inflate a tire while the chuck is revolving.

The stationary chuck member 114 is provided with a hollow axle member 117 which is detachably secured thereto by an annular plate 127. The axle 117 is journaled within a stationary housing 115 by means of suitable bearings 123, 125 which are spaced apart by a sleeve 139. The housing 115 is supported by a supporting structure 129 secured to a stationary platform 119. Also mounted on the platform 119 is the prime mover 121 (comprising a motor and speed reducing mechanism). Secured to the output shaft 131 of the prime mover is a sprocket 133 which is drivingly connected to the axle sprocket 135 by a chain (not shown).

The movable chuck member 112 is provided with a hollow axle member 141 having an annular plate 143 which is detachably secured to the chuck member. The axle 141 is journaled within a movable housing 145 by means of suitable bearings 147, 149 which are spaced apart by a sleeve 151. The housing 145 is carried by a supporting structure 153 secured to a prime mover such as a power cylinder (not shown) which is adapted to shift the chuck member axially. In operation, when the chuck member 114 is rotated by the prime mover 121, the frictional engagement of an inflated tire held between the two chuck members will operate as a coupling to connect the chuck members and tire for unitary rotation.

The outer end of the hollow axle 141 extends into a swivel joint 155. Air under pressure for tire inflation is supplied through the joint 155 and passes through the hollow axle 141 and thence into the space between the chuck members 112, 114 via an opening 157 in the chuck 112.

Air or other fluid under pressure is supplied to the piston cylinder 156 via the swivel joint 159 and tube 161 to drive the piston 154 and pivot the locking dogs 132 to a locking position in the same manner as hereinbefore described in connection with the FIG. 1 embodiment. The tube 161 is threaded to the end of the position rod 152 which is provided with an axial passageway 163 and radial passageways 165 to communicate with the cylinder 156. Secured to the outer end of the tube 161 is an annular plate 167. The plate 167 is adapted to actuate a switch arm 169 which controls the flow of air under pressure to inflate a trie mounted on the chuck mechanism. The arm 169 is provided with a roller 171 to permit frictionless rotation of the plate 167.

The chuck members 112, 114 are provided with detachable bead rings 120, 122. The rings 120, 122 are held in place by nute 173, 175 threaded on the outer periphery of the chuck members, and are fastened to the bead rings by means of machine screws 177. O-rings 179, 181 provide a fluid-tight seal between tthe bead rings and chuck members. The bead rings 120, 122 may be removed and replaced by different sized bead rings to permit operation of the chucking device with tires having various diameters.

The stationary and movable chuck members 112, 114 may be positioned vertically as shown in FIGURE 1 or horizontally as shown in FIGURE 4 or in any other desired angular relationship. Additionally, either of the chuck members may be above or below the other and also either may be held stationary while the other moves. Chuck movement may be axial as shown or the movable chuck member may be secured to an arm to be pivoted into place. It will be course be understood that if desired provision may be embodied in the FIGURE 1 construction to rotate the chuck and tire mounted thereon with its axis vertical.

Instead of having the locking members or dogs 32 and the locking surface 44 inside of the chuck, it is within the scope of my invention to place these locking means outside of the chuck as exemplified in FIGURES 5–8. In these figures modified forms of parts in FIGURES 1–4 are indicated by corresponding reference characters primed.

Figure 7:
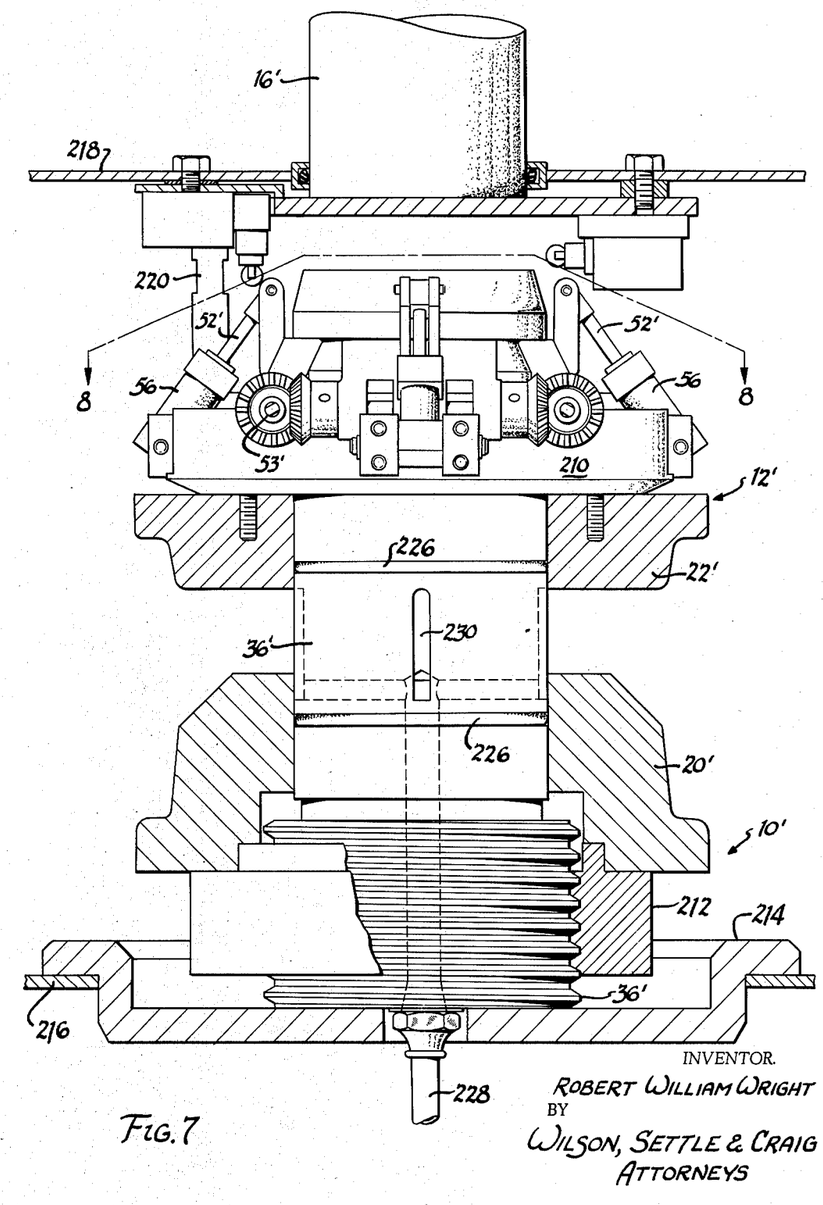
FIGURE 7 is a view, partly in section and partly in elevation of the actual structure of a complete chuck shown in part in FIGURE 5.

Referring to FIGURE 7, a lower chuck half 10' includes a tire bead supporting ring 20' and a center post 36'. The upper chuck half 12' includes a tire bead supporting ring 22' attached to a supporting ring 210. The rings 22' and 210 have a central opening through which the center post 36' is inserted when the chuck halves are being moved toward each other into position shown in FIGURE 7 in which they can hold a tire between them. The tire ring 20' is attached in any suitable manner to a supporting ring 212 which is threaded upon the center post to provide adjustment for various axial dimensions of tires. The center post 36' is secured in any suitable manner to a plate 214 which is sealed to the bottom of a tank 216 in which the post-inflated tire may be submerged in water for cooling. The upper chuck half 12' is secured to the cover 218 of the tank by three bolts 220 threaded into the ring 210 and into a supporting ring 222 bolted to the tank cover 218. A post 16' is secured to the ring 222 for attachment to a crane for raising and lowering the cover and upper chuck half 12'.

The center post 36' is sealed to the tire rings 22' and 20' by gaskets or elastic O-rings 226 so that the chuck halves and the tire together form a container for air under pressure, to which container air is admitted through conduit 228 and grooves 230.

In use, the assembly 224-16' is lifted out of the way, a tire is lowered over the center post 36' and seated on the lower tire ring 20', after which the assembly 224–16' is lowered over the post 36' until the upper tire ring 22' seats in the upper bead of the tire.

Thereafter, the two chuck halves are locked together by apparatus which will now be explained.

Figure 5:
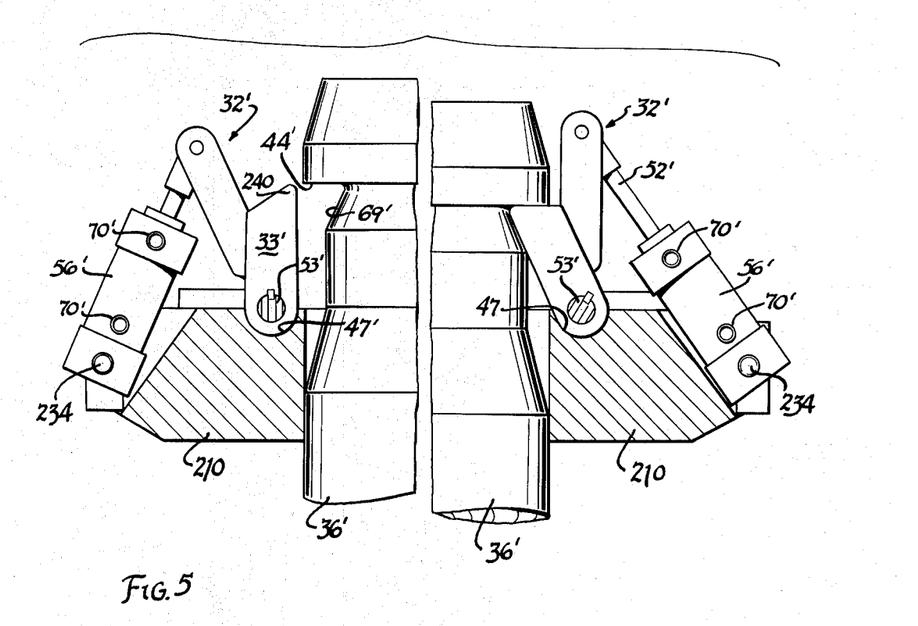
FIGURE 5 is a schematic section partly in elevation of a portion of a chuck embodying a second modified form of the invention. The figure is shown in two parts, the lefthand side illustrating the locking mechanism in unlocked position and the righthand side showing the locking mechanism in locked position.
Figure 8:
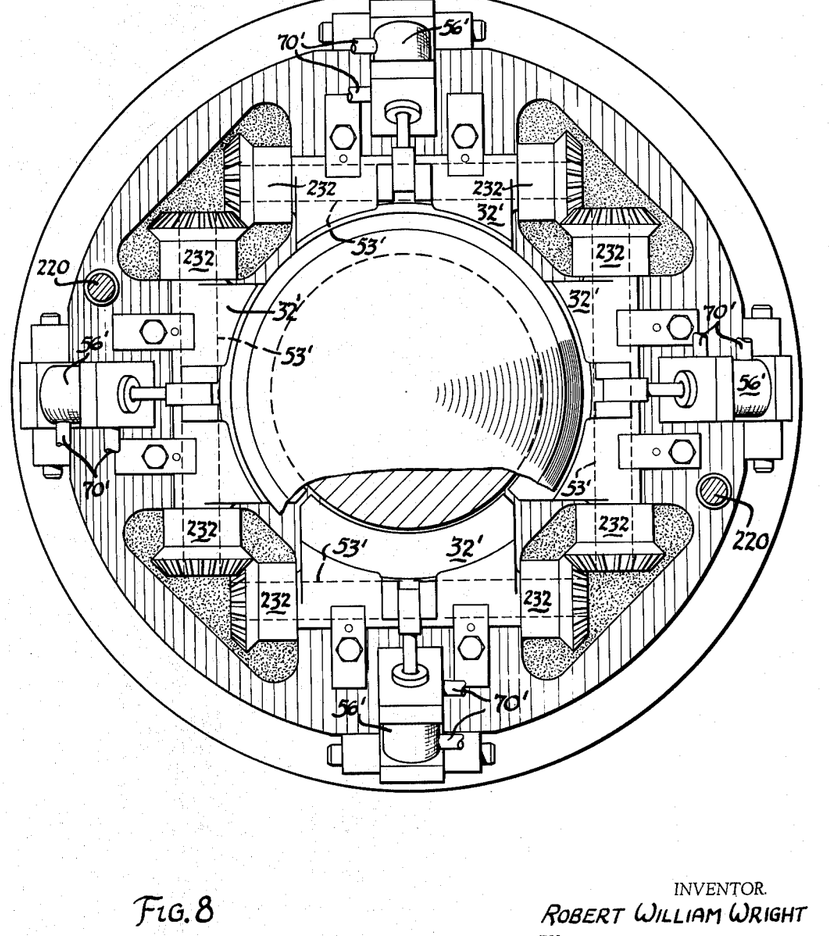
FIGURE 8 is a plan of the chuck shown in FIGURE 7 as seen from the surface whose trace is the line 8—8 in FIGURE 7.

As shown in FIGURE 5, the center post 36' has a notch near its upper end formed by two divergent surfaces. One surface is a flat, annuar locking surface 44' corresponding to the locking surface 44. The other surface 69' forms a male conical positioning surface corresponding to the surface 69 in FIGURE 1. Locking members 32' having load bearing portions 33' are seated and pivoted in bearing grooves 47' formed in the ring 210. Preferably four such locking members are used and as shown in FIGURE 8 each one extends substantially around a quarter of the post. Each locking portion is substantially a quarter of a conical ring having the same slope as the positioning conical surface 69'.

Each locking member 32' is keyed to a shaft 53' mounted in suitable bearings, not shown, attached to the ring 210. The shafts 53' retain thte locking members in the pivoting bearing grooves 47' and also serve as means to ensure identical positioning of the locking members.

Each of the locking members is pivoted between its locked and unlocked position by a piston rod 52' attached to a piston, not shown, in an air pressure cylinder 56', to either end of which air under pressure may be admitted by a conduit 70' while the opposite end is vented. Alternatively and preferably, the locks are moved to locked position by air pressure in the lower ends of the cylinders, and the locks are moved to unlocked position by a spring, not shown, corresponding to the spring 66 in FIGURE 1 when the cylinder is vented. The piston, cylinder and spring, if any, constitute a fluid pressure motor for pivoting the lock between unlocked and locked positions.

Because each piston is operated by an independent fluid pressure motor, it is desirable that all of the locks rotate synchronously and that they are positioned precisely alike when in locked position. To ensure this result in the event of failure of one of the fluid pressure motors, all of the locks 32' are geared together by bevel gears 232 keyed to opposite ends of the shafts 53' and meshing in pairs as shown in FIGURE 8. To permit swinging of the locks 32' between locked and unlocked position, each of the cylinders 56' is mounted on trunnions 234.

The operation of each locking dog 32' with respect to the locking surface 44' is the same as described above for 32 and the locking surface 44 in the modification of FIGURE 1. Air is admitted to and exhausted from the cylinders 56 by any suitable conduits 70' which constitute means for operating the cylinders to selectively position the dogs in locked and unlocked position.

It is contemplated that the chuck halves will be telescoped by the passage of the center post 36' through the tire ring 22' and the tire rings 22' and 20' will be brought together by any suitable means 16' in FIGURE 1. When this occurs, the center post will be in the position shown in FIGURE 5 and the locking dogs 32' will be in unlocked position as shown in the left half of FIGURE 5. Thereafter, the lower ends of the cylinders 52' will be pressurized by the appropriate conduit 70' and the locking dogs will be moved into locked position shown on the right side of FIGURE 5. At this time there is enough clearance between the surface 44' and the dogs to permit their corners 240 to rotate into locking position. Thereafter, the tire will be pressurized by admitting air through the passage 228 and the tire bead rings will move apart, moving the locking surface 44' against the locking dogs.

Figure 6:
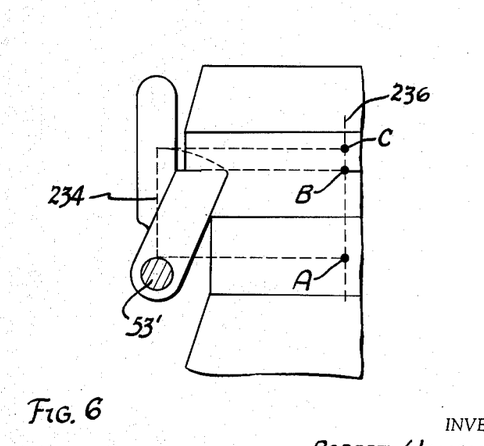
FIGURE 6 is a schematic elevation of a portion of FIGURE 5.

In FIGURE 6 the greatest length of the load-bearing portion of the locking dog is represented by the broken line 234. The line 236 represents the path of movement of the center post with respect to the ring 22' during relative movement of the tire rings. The projection of the line 234 on the line 236 when the dogs are in locking position has a length AB and the projection of the line 234 on the line 236 when the dogs are in unlocked position has a greater length AC. Consequently, the length of this projection must increase as the dogs move from locking to unlocking position. This requires that the tire rings be made to approach each other momentarily to move the post 36' from the position shown on the right of FIGURE 5 to the position shown on the left of FIGURE 5 before the dogs can be unlocked in order to provide clearance between the locking surface 44' and the corners 240 of the locking dogs. This arrangement prevents unlocking of the chuck while there is any air pressure in the tire, because the mechanism 16' which separates the chuck halves cannot be moved against this air pressure to provide this clearance.

This form of the invention is particularly useful for post inflating large airplane tires. The beads of such tires are of relatively small diameter and the chucks must sustain enormous force when the large diameter tire is inflated. This requires a locking mechanism which is to big to pass through the bead of the tire.

I claim:

1. An inflation support for a tire comprising in combination first and second telescoping chuck ring members having first and second radial flanges for supporting a tire between them; a circular locking surface surrounding a central opening and on an inner wall of one of the members; locking means forming part of the other member and passable through said opening when the chuck ring members are being telescoped, said locking means so passable through said opening including a central projection of said other member, a plurality of open grooves disposed about the periphery of the projection, said grooves having cylindrical bottom bearing surfaces and a locking member pivotally mounted in each groove, each locking member including a locking portion having one end bearing against the bottom of a groove and extending from the groove toward said one chuck member, said grooves being farther away from the radial flange on said other chuck ring member than said circular locking surface when the chuck ring members are fully telescoped into locking position so that separation of the chuck ring members requires the locking surface to approach the grooves and said locking portions being positionable between said grooves and said circular locking surface when said chuck ring members are fully telescoped; and means for selectively pivoting each of said locking portions in its groove between two positions, one position being radially inside the path traversed by the circular locking surface as the members are being telescoped, and the other position being between its groove and the circular locking surface so that the locking portions when in the second position resist forces exerted toward the bearing grooves by the circular locking surface.

2. A tire holding chuck comprising first and second telescoping chuck members having first and second tire supporting rings respectively movable relative to each other to hold a tire therebetween; said first chuck member being hollow and having a central opening to receive a projecting portion carried by said second chuck member; a plurality of locking dogs pivotally mounted on said projecting portion; each locking dog having a load bearing portion; one end of each load bearing portion being located in a bearing groove formed on the periphery of the projecting portion of the second chuck member; a locking surface on the first chuck member located between said grooves on said second chuck member and the second tire supporting ring when the members are fully telescoped; said load bearing portions being adapted to extend angularly between said grooves and said locking surface to resist forces exerted by said locking surface toward said grooves; means to pivot the locking dogs whereby when said first and second chuck members are fully telescoped said load bearing portions are positioned between said grooves and locking surface and prevent separation of said chuck members by compression forces in said load bearing portions.

3. A tire inflating and holding device comprising first and second telescopable chuck members having first and second tire supporting rings respectively movable relative to each other to hold a tire therebetween; said first chuck member being hollow and having a central opening to receive a projecting portion carried by said second chuck member; a plurality of locking dogs pivotally mounted on said projecting portion; each locking dog having a load bearing portion; one end of each load bearing portion being located in a bearing groove formed on the periphery of the projecting portion; a pair of angularly diverging surfaces formed on the first chuck member to receive a corner portion of each load bearing portion, said diverging surfaces being located between said grooves on said second chuck member and the second tire supporting ring when the members are fully telescoped; said load bearing portion being adapted to extend angularly between said grooves and said diverging surfaces to resist forces exerted by one of said divergent surfaces toward said grooves; means to pivot the locking dogs whereby when said first and second chuck members are fully telescoped said load bearing portions are positioned to engage said grooves and diverging surfaces so that one divergent surface holds the load bearing portions on the other divergent surface and the load bearing portions prevent separation of said chuck members by compression forces in the load bearing portions between the grooves and the other divergent surface.

4. A tire holding chuck comprising first and second telescopable chuck members having first and second tire supporting rings respectively movable relative to each other to hold a tire therebetween; said first chuck member being hollow and having a central opening to receive a projecting portion carried by said second chuck member; a plurality of locking dogs pivotally mounted on said projecting portion; each locking dog having a load bearing portion; each of said load bearing portions comprising a segment of a conical ring; one end of each load bearing portion being located in a bearing groove in the outer surface of the projecting portion of the second chuck member; an annular locking surface formed within said first chuck member to engage the opposite ends of the load bearing portions, said locking surface being located between said grooves on said second chuck member and the second tire supporting ring when the members are fully telescoped; a shoulder formed on each load bearing portion to abut against the inner peripheral surface of said first chuck member; said load bearing portions being adapted to extend angularly between said grooves and locking surface to resist forces exerted by said locking surface toward said grooves; means to pivot the locking dogs to said angular engaging position and to place said shoulders against the inner peripheral surface of the first chuck member so that when said first and second chuck members are fully telescoped said shoulders will hold the load bearing elements on the locking surface and the locking dogs will prevent separation of the chuck members by compression forces in the load bearing portions between the grooves and the locking surface.

5. A tire inflating and holding device comprising first and second telescoping chuck members having first and second tire supporting rings respectively movable relative to each other to hold a tire therebetween; said first chuck member being hollow and having a central opening to receive a hollow projecting portion carried by said second chuck member; a plurality of locking dogs pivotally mounted on said projecting portion; each locking dog having a load bearing portion; one end of each load bearing portion being located in a bearing groove formed on the projecting portion of said second chuck member; a locking surface formed within said first chuck member adjacent the opening thereto located between said grooves on said second chuck member and the second tire supporting ring when the members are fully telescoped; an operator slidably mounted within the hollow projecting portion; an arm extending from each load bearing portion into said projecting portion and connected to said operator; said operator being operable to pivot the locking dogs to position the locking portions between said grooves and locking surface to resist forces exerted by the locking surface toward the grooves when the chuck members are telescoped by compression forces in the load bearing elements between the grooves and the locking surface.

6. An inflation support for a tire comprising in combination first and second chuck members including first and second tire supporting rings, respectively, movable toward each other for supporting a tire under pressure between them and movable away from each other for releasing the tire; first locking means including a planar annular locking surface on one of the members; second locking means secured to the other member; one of the locking means being passable through the other locking means when the chuck members approach each other to hold a tire; means on said other member defining a plurality of open grooves, each having a cylindrical bottom bearing surface and a locking member of said second locking means pivotally mounted in each groove; each locking member including a locking portion having one end bearing against the bottom of a groove and extending from the groove toward said annular locking surface when the chuck members are in position to hold a tire, so that separation of the chuck members to release the tire requires the annular locking surface to approach the grooves, and said locking portions being positionable between said grooves and said annular locking surface when said chuck members are in position to hold a tire; and means for selectively pivoting each of said locking portions in its groove between two positions, one position being out of the path traversed by the annular locking surface as the chuck members move relatively, and the other position being between its groove and the annular locking surface so that the locking portions when in the second position resist separation of the chuck members by resisting forces exerted toward the bearing grooves by the annular locking surface.

7. A tire holding chuck comprising first and second chuck members including first and second tire supporting rings, respectively, movable relative to each other to hold a tire under pressure therebetween and movable away from each other for releasing the tire; a projection secured to one chuck member and receivable within an opening in the other chuck member; first locking means including a locking surface defining a plane; a second locking means including a plurality of pivoted locking members; one of the locking means being secured to said projection on said one chuck member and the other locking means being secured to the other chuck member; each of said pivoltally mounted locking members having a load bearing portion, one end of each load bearing portion being located in a bearing groove formed on the chuck member to which said second locking means is secured, and the load bearing portions being located between said grooves and the plane of the locking surface when the chuck members are in position to hold a tire, said load bearing portions being adapted to extend angularly between said grooves and said locking surface to resist forces exerted by said locking surface toward said grooves; and means to pivot the locking dogs whereby when said first and second chuck members are in position to hold a tire said load bearing portions are positioned between said grooves and locking surface and prevent separation of said chuck members by compression forces in said load bearing portions.

8. A tire holding chuck comprising first and second chuck members including first and second tire supporting rings respectively movable relative to each other to hold a tire under pressure therebetween and movable away from each other for releasing the tire; a projection secured to one chuck member and receivable within an opening in the other chuck member; first locking means including a pair of angularly diverging surfaces, one of which surfaces defines a plane; second locking means including a plurality of pivoted locking members; one of the locking means being secured to said projection on said one chuck member and the other locking means being secured to the other chuck member; each of said pivotally mounted locking members having a load bearing portion having a corner, one end of each load bearing portion being located in a bearing groove formed on the chuck member to which said second locking means is secured, said load bearing portions being located between said grooves and said plane when the chuck members are in a position to hold a tire between them, said load bearing portions being adapted to extend angularly between said grooves and said diverging surfaces with said corner disposed in the angle between the diverging surfaces when the chuck members are in position to hold a tire; and means for pivoting the locking members to place said corners between said diverging surfaces with said load bearing portions in engagement with said grooves, so that one diverging surface holds the load bearing portions on the other diverging surface and the load bearing elements prevent separation of said chuck members by compression forces in the load bearing portions between the grooves and said other diverging surface.

9. A tire holding chuck comprising first and second chuck members including first and second tire supporting rings, respectively, movable relative to each other to hold a tire under presure therebetween and movable away from each other for releasing the tire; a first locking means including a pair of diverging surfaces secured to one chuck member, one of said diverging surfaces defining a plane; second locking means secured to the other chuck member, said second locking means including a plurality of locking members pivotally mounted on said other chuck member and each having a load bearing portion, each of said load bearing portions comprising a segment of a conical ring, one end of each load bearing portion being located in a bearing groove on said other chuck member, said load bearing portions being located between said grooves and said plane when the chuck members are in position to hold a tire; a shoulder formed on each load bearing portion and adapted to abut one of said diverging surfaces, said load bearing portions being adapted to extend angularly between said grooves and said diverging surfaces to resist forces exerted by one of said diverging surfaces towards said grooves; means to pivot the locking dogs to said angularly engaging positions and to place said shoulders against the first mentioned diverging surface so that the shoulders will hold the load bearing portions on said other diverging surface and the locking members will prevent separation of the chuck members by compression forces in the load bearing portions between the grooves and said other diverging surface.

10. Apparatus as defined in claim 8 in which the means for pivoting the locking members to place the corners between the diverging surfaces is a plurality of individual fluid pressure motors, one connected to each locking member.

11. Apparatus as defined in claim 8 in which the means for pivoting the locking members to place the corners between the diverging surfaces is a plurality of individual fluid pressure motors, one connected to each locking member and in which there is means positively connecting the operators together for enforcing synchronous rotation of the locking members about their pivots.

12. Apparatus as defined in claim 8 in which the means for pivoting the locking members to place the corners between the diverging surfaces is a plurality of individual fluid pressure motors, one connected to each locking member, and in which there is a shaft rigidly secured to each locking member and gears positively connecting said shafts for synchronous rotation thereof.

13. A tire holding chuck for a post inflator or the like comprising first and second chuck members including first and second annular tire supporting rings concentric about a common vertical axis, means for moving said chuck members relative to each other along said vertical axis between a completely separated tire receiving open position, an abutted fully closed position and a partially opened tire locking position, an annular downwardly facing locking surface on said first chuck member concentric about said vertical axis, means on said second chuch member defining a plurality of upwardly opening grooves each having a cylindrical bottom bearing surface, said grooves extending tangentially of said vertical axis in symmetrically disposed relationship thereabout and being located below said locking surface of said first chuck member when said chuck members are in their closed or partially opened position and being located above said locking surface when said chuck members are in their opened position, a plurality of locking members each having a partially cylindrical bearing surface seated in each of said grooves for pivotal movement on said second chuck member about the axis of the cylindrical groove, a load bearing portion on each locking member located above the axis of the associated cylindrical groove for movement radially of said vertical axis upon pivoting of the locking member about the groove axis, control means coupled to said locking members operable to pivot said locking members to a position where said locking members radially clear said locking surface to permit movement of said chuck members from their opened to their closed position, and means operable when said chuck members are in their closed position for operating said control means to pivot said locking members in a direction moving the load bearing portion of each locking member radially of said vertical axis into underlying relationship with said locking surface to be engaged thereby upon movement of said chuck members to their locking position.

14. A tire holding chuck as defined in claim 13 further comprising an annular frusto-conical surface on said first chuck member concentric with and adjacent to said locking surface and inclined downwardly into underlying relationship with said locking surface, an inclined surface on said load bearing portions of said locking members engageable with said frusto-conical surface on said first chuck member when said load bearing portions are engaged with said annular locking surface, separating movement of said chuck members beyond their locking position being applied by said annular locking surface to said locking members in a direction urging said locking members in pivotal movement forcing the inclined surface of the locking member against staid frusto-conical surface.

References Cited by the Examiner
UNITED STATES PATENTS

| | | | |
|---|---|---|---|
| 1,274,685 | 8/1918 | Cline | 279—123 |
| 1,703,715 | 2/1929 | Booth. | |
| 2,745,137 | 5/1956 | Glyn. | |
| 2,824,336 | 2/1958 | Weigold et al. | |
| 2,866,500 | 12/1958 | George et al. | |

WILLIAM W. DYER, JR., *Primary Examiner.*

DONALD R. SCHRAN, *Examiner.*